April 27, 1954 K. L. VRACIU Re. 23,818

MATERNITY GIRDLE

Original Filed March 3, 1950

Inventor
Kathryn L. Vraciu

By Wilfred E. Lawson
Attorney

Reissued Apr. 27, 1954

Re. 23,818

UNITED STATES PATENT OFFICE 23,818

MATERNITY GIRDLE

Kathryn L. Vraciu, Santa Ana, Calif.

Original No. 2,606,322, dated August 12, 1952, Serial No. 147,416, March 3, 1950. Application for reissue April 7, 1953, Serial No. 347,425

3 Claims. (Cl. 2—41)

Matter enclosed in heavy brackets [ ] appears in the original patent but forms no part of this reissue specification; matter printed in italics indicates the additions made by reissue.

This invention relates to a maternity girdle, and it is an object of the invention to provide a garment of this kind which is free of parts, such as stays or laces, that would be irritating to the skin of the wearer.

It is also an object of the invention to provide a garment of this kind which can be worn with comfort and which provides an effective support especially during the later stage of pregnancy.

A still further object of the invention is to provide a girdle wherein the front upper portion is provided with a relatively large cutout together with a series of inserts to be selectively placed in the cutout, said inserts of a series being successively enlarged to allow for normal growth.

The invention consists in the details of construction and in the combination and arrangement of the several parts of my improved maternity girdle, whereby certain advantages are attained, as will be hereinafter more fully set forth.

In order that my invention may be better understood, I will now proceed to describe the same with reference to the accompanying drawings wherein.

Figure 1:
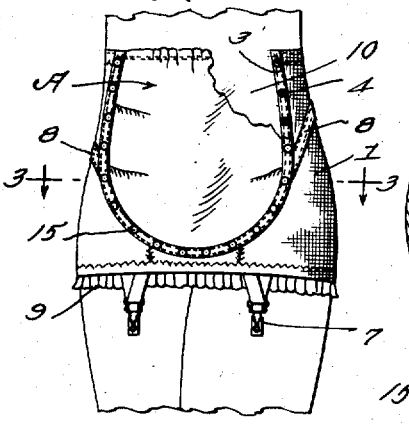
Figure 1 is a view in front elevation of a maternity garment constructed in accordance with an embodiment of the invention and in applied position.
Figure 3:
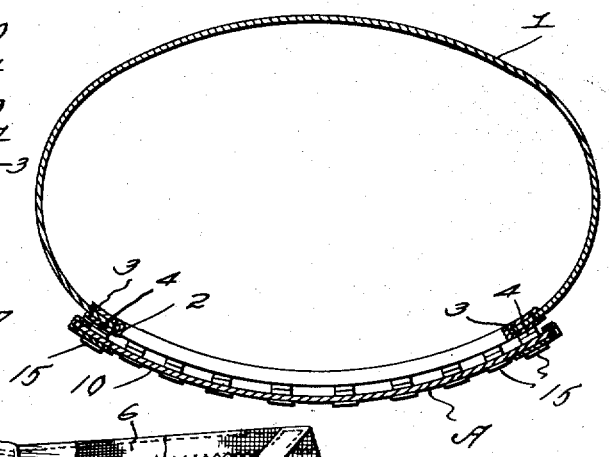
Figure 3 is an enlarged sectional view taken substantially on the line 4—4 of Figure 1.
Figure 2:
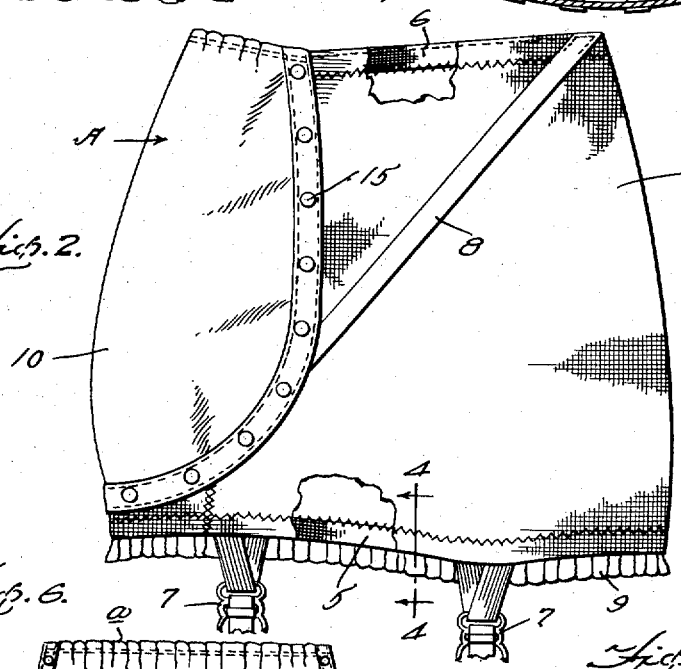
Figure 2 is an elevational view of the garment in flattened condition, portions being broken away.
Figure 4:
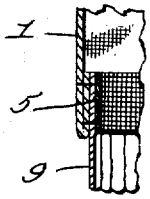
Figure 4 is an enlarged fragmentary sectional view taken substantially on the line 4—4 of Figure 2.
Figure 6:
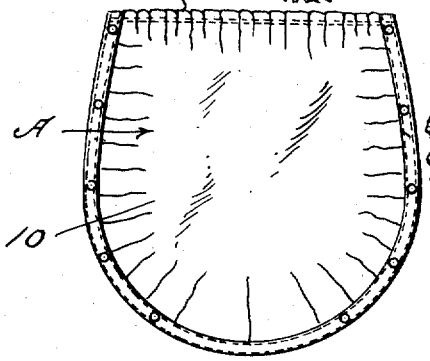
Figure 6 is an elevational view of an insert unapplied.
Figure 5:
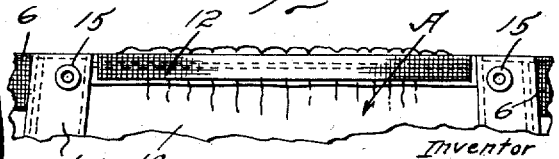
Figure 5 is a fragmentary view in rear or inside elevation of the upper portion of an insert.

As illustrated in the accompanying drawings, 1 denotes a continuous or endless band of stretchable or elastic material adapted to fit snugly upon the person around the hips and over the lower portion of the torso over the abdominal region.

The front portion of the band is provided with a large cut out 2 open at the upper edge of the band and extending to a point closely adjacent to the lower margin of the band, the portion of the band 1 below the cutout 2 being unbroken.

The cutout 2 is also of a material width so that the area of the cutout 2 exposes substantially the entire area of the abdominal region of the wearer, below the approximate waist line. A non-elastic selvedge 3 is secured to the marginal portion of the cutout 2 and spaced along said selvedge are the outwardly disposed fastening elements 4, such as resilient heads.

The lower marginal portion, including the portion 1a below the cutout 2, of the band 1 has secured therearound an elastic strip 5 while the upper marginal portion of the band 1 from one side of the cutout 2 to the other has secured thereto the elastic band 6. These bands 5 and 6 serve to further tension the band 1 about the person, between the waist line and the approximate plane of the right and left iliac regions.

The lower marginal portion 1a of the band 1 lies in, or slightly below, the plane of the right and left iliac regions, and has suitably secured thereto in required spaced positions the depending hose supports 7 of preferred style. These supporters provide means to hold the applied band against upward movement on the body of the wearer and thus increases the efficiency of the girdle.

The band 1 at each side of the cutout 2 has secured thereto a strip or tape 8 which extends from the lower portion of the cutout 2 on a rearward and upward incline. The tapes or strips 8 assure further effective support and more particularly during the later period of pregnancy.

The lower marginal portion of the band 1 may have attached therein a length 9 of a suitable trim although this is only incidental.

In association with the band 1 there is to be used a series of inserts A successively of different fullness proportionate to the normal growth during pregnancy. It is believed, however, that for the purpose of disclosure, a detailed description of a single insert A is sufficient.

The insert A comprising a suitable cut or panel of light non-stretchable cloth 10 and the marginal portions of the cloth 10 are gathered, as at 11, to give the insert the desired fullness. The contour and dimensions of the insert A is substantially the same as that of the cutout 2 and is provided with a straight top marginal portion a along which is secured an elastic strip 12 providing means to prevent the top portion of the applied insert A from dropping or sagging when the garment is being worn.

The marginal portion of the insert A from the opposite ends of the top straight margin a has secured thereto the selvedge 14 along which are the spaced and inwardly disposed fastening elements 15 herein disclosed as socket members, for coaction with the fastening elements 4 whereby the insert A is removably but effectively held in applied position over the cutout 2. The dimensions of the insert A are such to allow the side and lower portions of the insert A to overlie the marginal portions of the cutout 2.

*From the above description it will be seen that my novel maternity girdle provides advantages of use not found in previously available garments adapted for this purpose.*

*The cutout 2 permits the garment to be placed on or removed from the figure with a minimum of physical effort and inconvenience, which is of utmost importance during the period of pregnancy. Also, when insert A is removably affixed in place to form a portion of band 1, my garment completely envelopes that portion of the female figure extending downwardly from the waistline to a point of the upper thigh just below the buttocks.*

*In addition, because of its resilient, compliant construction, my girdle smoothly conforms to the abnormal contours of the figure during the period of pregnancy to provide a comfortable, supporting fit, and inasmuch as no lacings or bulky fastenings are employed therewith the garment adds to the attractiveness and enhances the appearance of the wearer.*

*The reinforcing strips or tapes 8 of my invention also provide an additional important advantage over prior devices of this type in that the tapes support the abdominal area covered by insert A to give further comfort to the wearer and prevent deformation of the resilient band.*

*My invention also provides the advantage that it remains in the desired abdomen-supporting position on the figure without requiring the use of straps or like accesssories extending upwardly over the shoulders of the wearer.*

*In addition to the above enumerated advantages, my girdle is adapted to be fabricated from standard, inexpensive commercially available materials, and due to the simplicity of its structure, may be manufactured to sell in the medium-priced merchandising field.*

From the foregoing description it is thought to be obvious that a maternity girdle constructed in accordance with my invention is particularly well adapted for use by reason of the convenience and facility with which it may be assembled and used.

I claim:

1. In a maternity girdle, a one piece band of an elastic material having its back and side portions of substantially equal height to extend downward from the approximate waist line of the wearer a distance that the lower portions of the sides overlie the hips, the front of the band having a cutout separating the side portions above a relatively narrow bottom portion extending across the abdomen approximately in the plane of the right and left iliac regions, elastic reinforcing strips secured along the top and bottom edge portions of the band, a selvedge strip bounding the edge of the cutout, non-elastic reinforcing strips extending diagonally upward and rearward about the side portions from intermediate points of connection with the opposite side edges of the cutout to points of connection with the top edge of the back portion, an insert of a non-elastic material having a selvedge edge for the cutout, and separable fasteners carried by the said selvedge edges for securing the insert in place.

*2. In a maternity girdle, a continuous form-fitting band of sheet material having a back and side portions and a front portion, said front portion having a cutout separating said side portions above a relatively narrow bottom portion, elastic means that maintain tension on substantially the upper and lower edge portions of said band, an insert of sheet material of the same general shape as said cutout, fastening means disposed on the edge portions of said insert and the edge portions of said band adjacent said cutout that may engage one another to removably hold said insert in place to form a part of said girdle, and elongate reinforcing areas that proceed downwardly and forwardly across said side portions from said upwardly disposed elastic means to terminate adjacent said cutout.*

*3. In a maternity girdle, a continuous form-fitting band of resilient sheet material having a back and side portions and a front portion, said front portion having a cutout separating said side portions above a relatively narrow bottom portion, elastic means that maintain tension on substantially the upper and lower edge portions of said band, two elongate reinforcing areas provided on said band, with each of said areas proceeding upwardly and rearwardly on said band from a position adjacent one of the lower side portions of said cutout to a position on substantially the upwardly disposed edge of said back portion, an insert of sheet material of the same general shape as said cutout, and fastening means disposed on said insert and the edge portions of said band adjacent said cutout that may engage one another to removably hold said insert in place to form a part of said girdle.*

References Cited in the file of this patent or the original patent

UNITED STATES PATENTS

| Number | Name | Date |
|---|---|---|
| 1,079,552 | Herman | Nov. 25, 1913 |
| 1,301,618 | Stradling | Apr. 22, 1919 |
| 2,283,108 | Versoy | May 12, 1942 |
| 2,306,546 | Kispert | Dec. 29, 1942 |
| 2,464,093 | Lo Cascio | Mar. 8, 1949 |
| 2,469,793 | Siegel | May 10, 1949 |
| 2,472,154 | Fiorito | June 7, 1949 |
| 2,544,386 | Jacobs et al. | Mar. 6, 1951 |
| 2,575,605 | Vandercook | Nov. 20, 1951 |
| 2,587,307 | Garduno | Feb. 26, 1952 |